(12) United States Patent
Brakob et al.

(10) Patent No.: US 12,373,656 B2
(45) Date of Patent: Jul. 29, 2025

(54) SYSTEM AND METHOD OF USING KEYS THAT HAVE A BARCODE IDENTIFIER AND AN RFID TAG

(71) Applicant: Target Brands, Inc., Minneapolis, MN (US)

(72) Inventors: Christopher M. Brakob, Maple Grove, MN (US); Andrew J. Wipf, Jordan, MN (US); Kathleen J. Roush, Maple Grove, MN (US); Jason M. Kadrmas, Lauderdale, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/460,115

(22) Filed: Sep. 1, 2023

(65) Prior Publication Data

US 2025/0077807 A1     Mar. 6, 2025

(51) Int. Cl.
*G06K 7/10*       (2006.01)
*G06K 7/14*       (2006.01)
*G06K 19/06*      (2006.01)
*G06K 19/07*      (2006.01)

(52) U.S. Cl.
CPC ....... *G06K 7/10366* (2013.01); *G06K 7/1413* (2013.01); *G06K 19/06028* (2013.01); *G06K 19/0723* (2013.01)

(58) Field of Classification Search
CPC .................................................. G06K 19/048
See application file for complete search history.

(56) References Cited

U.S. PATENT DOCUMENTS 5,038,023 A * 8/1991 Saliga .................. G07C 9/33
                                                              235/475
6,232,876 B1    5/2001 Maloney
                                (Continued)

FOREIGN PATENT DOCUMENTS

| CN | 203882364 U | 10/2014 |
| CN | 205106928 U | 3/2016 |
| CN | 112907791 A | 3/2022 |

OTHER PUBLICATIONS

Koulamas, The MERIT Middleware: A platform for interoperable RFID-based systems for access control and monitoring in marine transportation, Greek General Secretariat for Research Technology under Grant No. 09SYN-52-658, pp. 247-257, 2014.

*Primary Examiner* — Suezu Ellis
(74) *Attorney, Agent, or Firm* — Theodore M. Magee; Westman, Champlin & Koehler, P.A.

(57) ABSTRACT

A keyset includes a plurality of keys, a holder attached to each of the keys in the plurality of keys, an RFID tag positioned within the holder, and a barcode positioned within the holder. A system includes a server and a first handheld device configured to scan a barcode on a keyset to obtain a barcode identifier and to relay the barcode identifier to the server to check the keyset out of a key cabinet. An RFID reader is configured to receive an RFID signal from an RFID tag on the keyset to obtain an RFID identifier and to relay the RFID identifier to a second handheld device. The second handheld device is configured to receive the RFID identifier sent by the RFID reader and to determine that the keyset was detected during a scan of a key cabinet based on the received RFID identifier.

7 Claims, 18 Drawing Sheets

(56) References Cited

U.S. PATENT DOCUMENTS

| | | | |
|---|---|---|---|
| 6,392,543 B2 * | 5/2002 | Maloney | G08B 13/1463 |
| | | | 340/568.1 |
| 6,882,282 B1 | 4/2005 | Lie-Nielsen et al. | |
| 8,191,781 B2 | 6/2012 | Heinz et al. | |
| 9,053,592 B2 | 6/2015 | Sato et al. | |
| 9,954,835 B2 | 4/2018 | Brown et al. | |
| 10,682,980 B1 | 6/2020 | Ghamsari et al. | |
| 2011/0079652 A1 * | 4/2011 | Bass | G06Q 10/087 |
| | | | 235/487 |
| 2021/0241557 A1 | 8/2021 | Pettersson | |

* cited by examiner

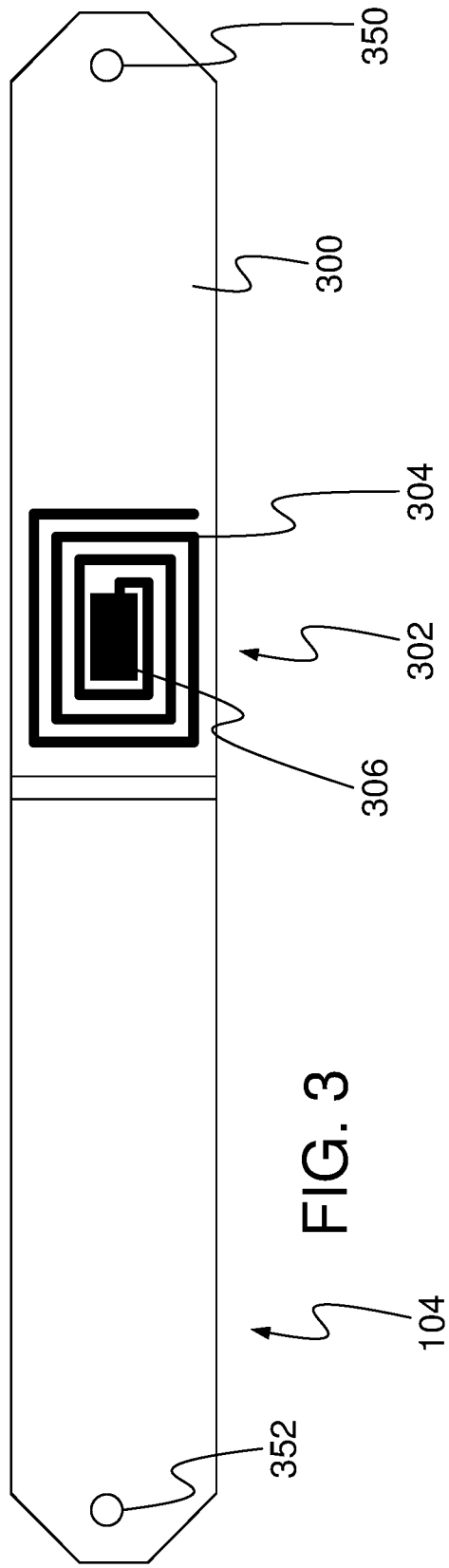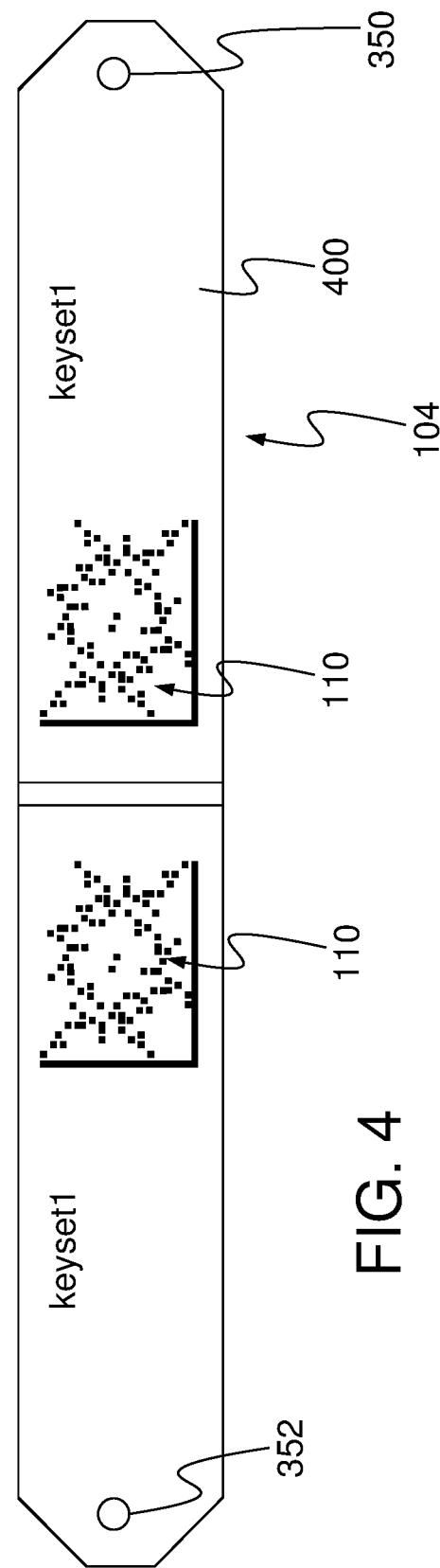

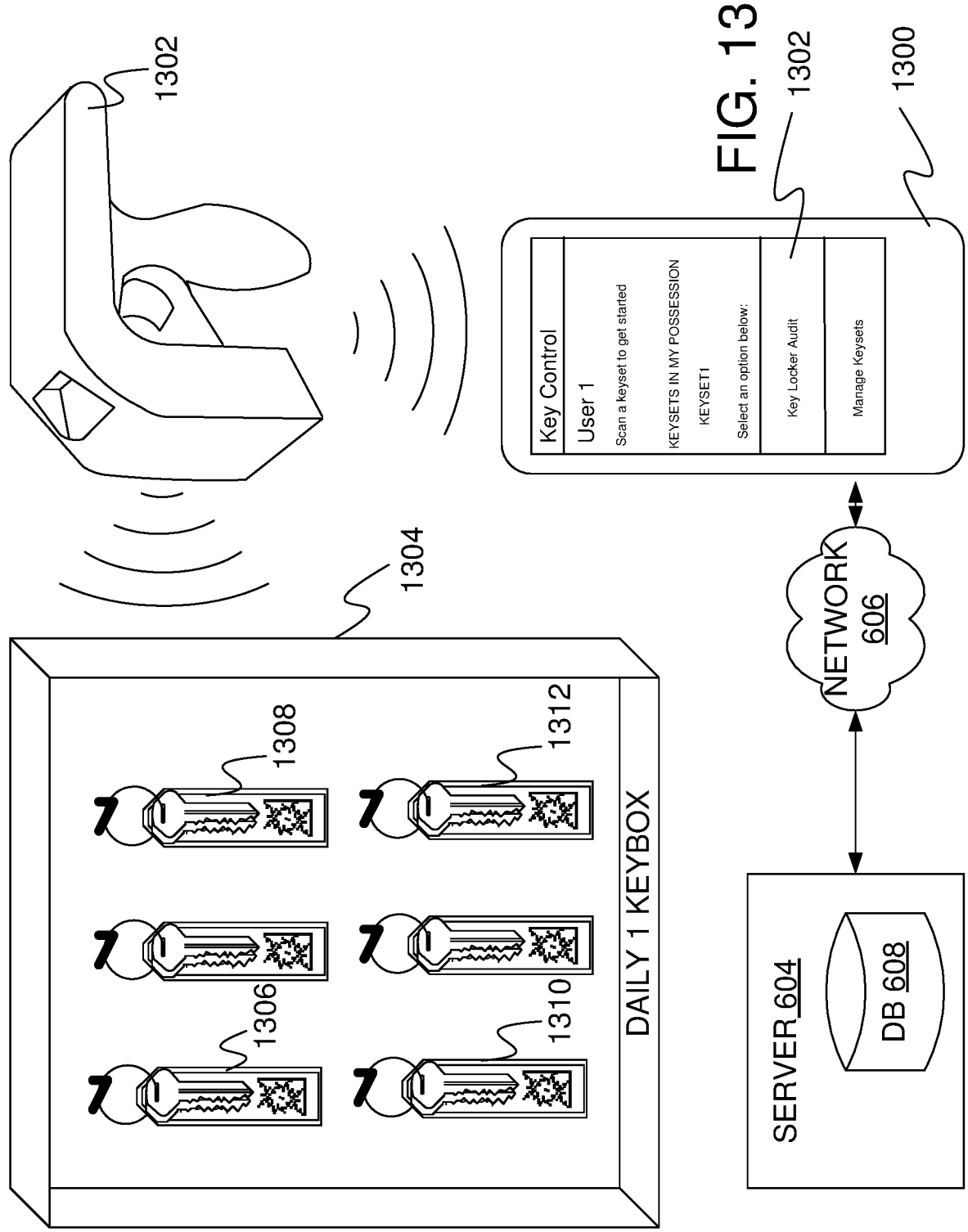

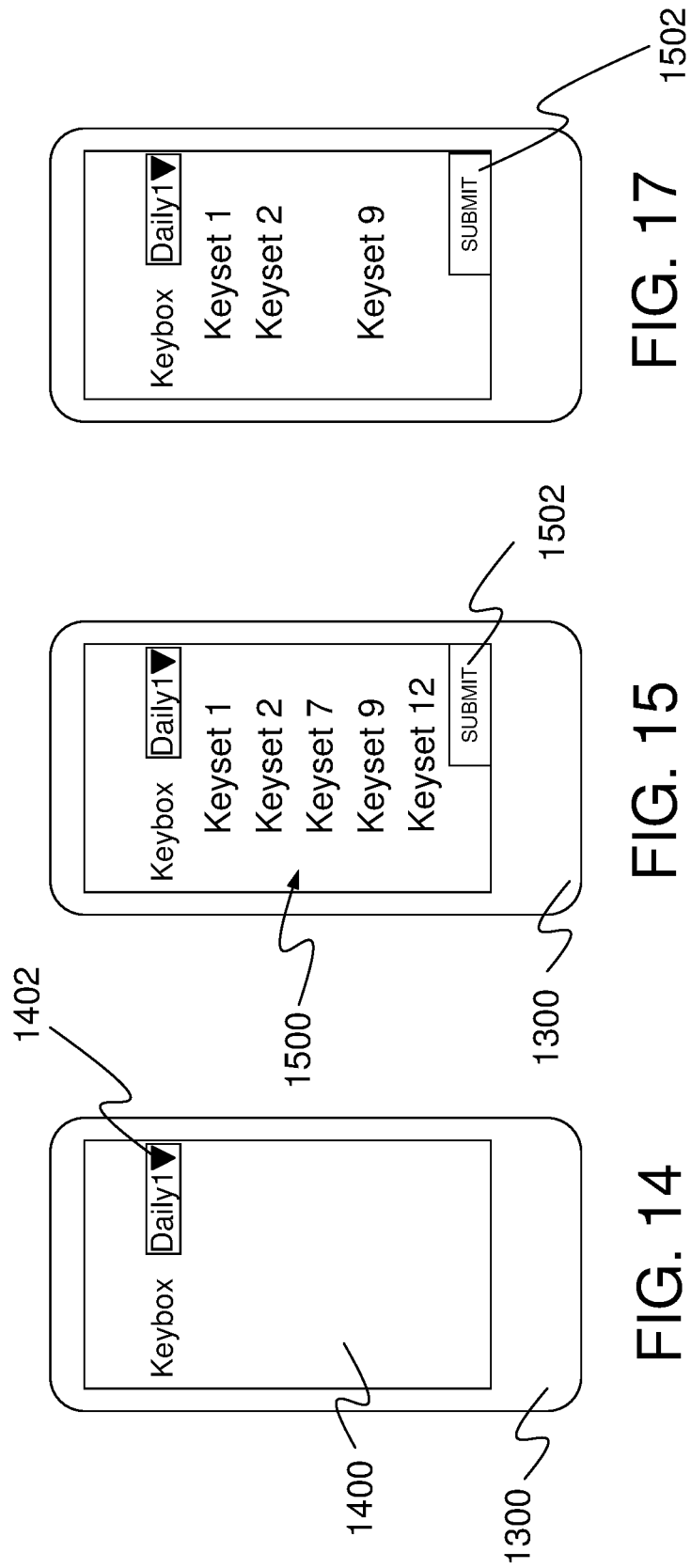

SYSTEM AND METHOD OF USING KEYS THAT HAVE A BARCODE IDENTIFIER AND AN RFID TAG

BACKGROUND

In order to safely operate large buildings, a large number of keys are needed. Keeping track of who has those keys is a difficult task. If keys cannot be found, it is often necessary to change the locks, which represents a significant cost to operating the building.

The discussion above is merely provided for general background information and is not intended to be used as an aid in determining the scope of the claimed subject matter. The claimed subject matter is not limited to implementations that solve any or all disadvantages noted in the background.

SUMMARY

A keyset includes a plurality of keys, a holder attached to each of the keys in the plurality of keys, an RFID tag positioned within the holder, and a barcode positioned within the holder.

In accordance with a further embodiment, a system includes a server and a first handheld device configured to scan a barcode on a keyset to obtain a barcode identifier and to relay the barcode identifier to the server to check the keyset out of a key cabinet. An RFID reader is configured to receive an RFID signal from an RFID tag on the keyset to obtain an RFID identifier and to relay the RFID identifier to a second handheld device. The second handheld device is configured to receive the RFID identifier sent by the RFID reader and to determine that the keyset was detected during a scan of a key cabinet based on the received RFID identifier.

In accordance with a still further embodiment, a method includes scanning a barcode on a keyset using a first mobile device to obtain an identifier for the keyset and sending to a server: the identifier for the keyset and an indication that the keyset has been checked out from a key cabinet by a user of the first mobile device. The barcode on the keyset is then scanned using a second mobile device to obtain the identifier for the keyset. The selection of a transfer button on the second mobile device is received and in response the following is sent to the server: the identifier for the keyset and an indication that the keyset has been transferred from the user of the first mobile device to a user of the second mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a plan view of an interior surface of the substrate of FIG. 1.

FIG. 4 is a plan view of an exterior surface of the substrate of FIG. 1.

FIG. 13 is a block diagram of elements used in the method of FIG. 12.

FIG. 14 is a view of a user interface for selecting a key cabinet.

FIG. 15 is a view of a user interface before the scanning of the key cabinet begins.

FIG. 17 is a view of a user interface during scanning of the key cabinet.

DETAILED DESCRIPTION

Embodiments described below provide keysets and a system that allows the keysets to be checked out electronically without requiring specialized key cabinets. In particular, the keysets include RFID tags that can be scanned by existing portable RFID scanners and barcodes that can be scanned by existing mobile devices to allow for fast checkout of keysets and fast auditing of keysets present in a key cabinet.

Figure 1:
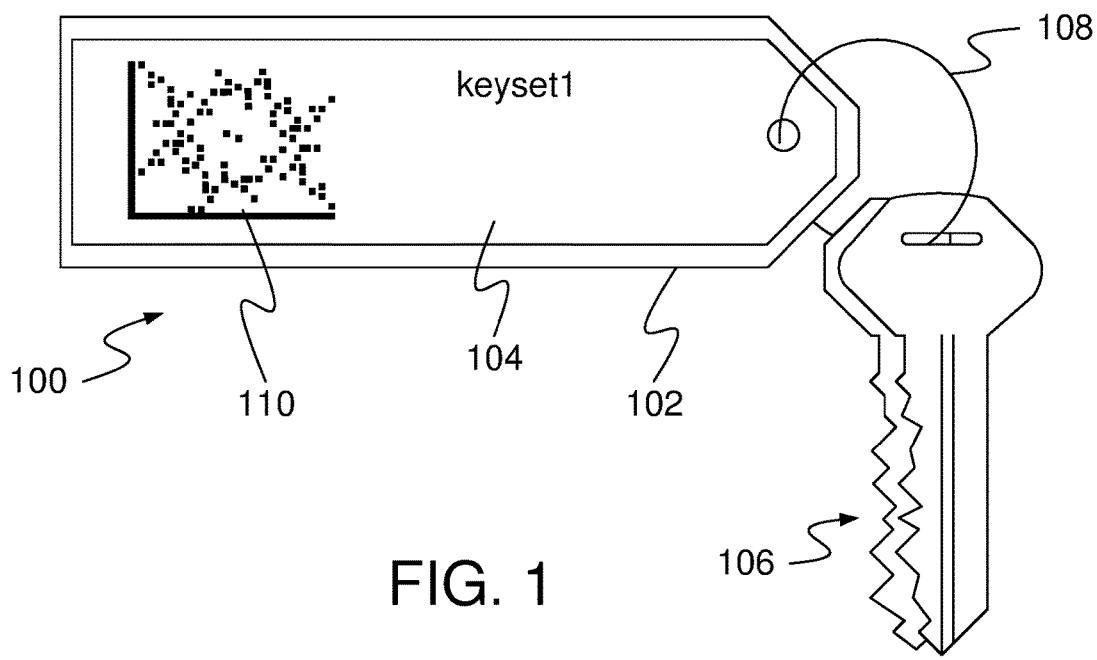
FIG. 1 is a top view of a keyset in accordance with one embodiment.

FIG. 1 provides a top view of a keyset 100 consisting of a holder 102, a substrate 104 a collection of keys 106 and a key ring 108, which connects keys 106 to holder 102 and substrate 104. As shown in FIG. 1, substrate 104 includes a barcode 110, which in the embodiment of FIG. 1 is a two-dimensional barcode.

Figure 2:
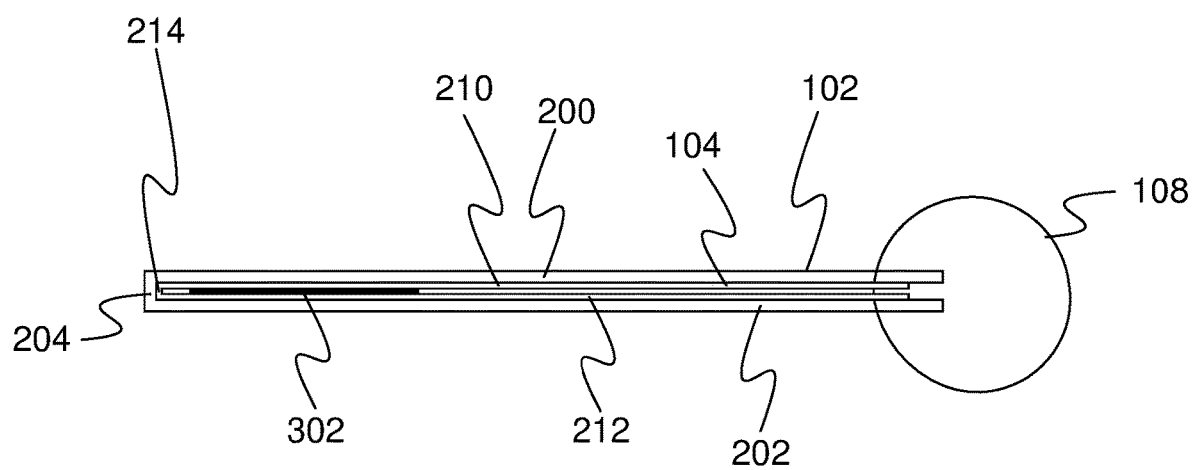
FIG. 2 is a side view of the keyset of FIG. 1.

FIG. 2 provides a side view of holder 102, substrate 104 and ring 108. As shown in FIG. 2, holder 102 has a top wall 200, a bottom wall 202 and a sidewall 204, which connects top wall 200 to bottom wall 202. In accordance with one embodiment, walls 200, 202 and 204 are constructed of plastic and are transparent to visible light. Together, walls 200, 202 and 204 form a U-shape with an open front and back and with an open side surface opposite sidewall 204.

Substrate 104 has a similar U-shape to holder 102 and includes a first segment 210, a second segment 212 and a third segment 214 that connects first segment 210 to second segment 212. Substrate 104 is positioned within holder 102, such that walls 200, 202 and 204 prevent contact with substrate 104 by items external to holder 102. In particular, holder 102 prevents keys 106 from contacting substrate 104 and prevents a key cabinet, discussed later, from contacting substrate 104.

Substrate 104 has an interior surface 300 which faces itself and an exterior surface 400 which faces holder 102.

FIG. 3 provides a view of substrate 104 laid flat and showing interior surface 300 of substrate 104. FIG. 4 provides a view of substrate 104 laid flat and showing exterior surface 400 of holder 104.

As shown in FIG. 3, interior surface 300 has printed thereon an RFID tag 302 consisting of an antenna 304 and an integrated circuit 306. RFID tag 302 is able to receive radio frequency signals, use those signals to power integrated circuit 306 and generate response radio frequency signals containing a radio frequency identifier associated with RFID tag 302.

Exterior surface 400 of substrate 104 includes two identical barcodes 110 that provide the same barcode identifier when scanned. Substrate 104 also includes through holes 350 and 352 that accept key ring 108 when substrate 104 is placed within holder 102. Exterior surface 400 also includes a keyset name 402 that is used to refer to the keyset.

Holder 102 is constructed from a clear plastic so as to prevent electrical contact between RFID tag 302 and any external metal surfaces, such as keys 106 while allowing barcode 110 on substrate 104 to be read through holder 102. Such clear plastic is subject to scratching by keys 106 and this scratching can make it impossible to read a one-dimensional barcode on substrate 104. To overcome this problem, a two-dimensional barcode 110 is used instead of a one-dimensional barcode.

Barcode 110 provides a barcode identifier while RFID tag 302 provides an RF identifier. In accordance with one embodiment, these are two distinct values that are both associated with the keyset in a database.

Figure 5:
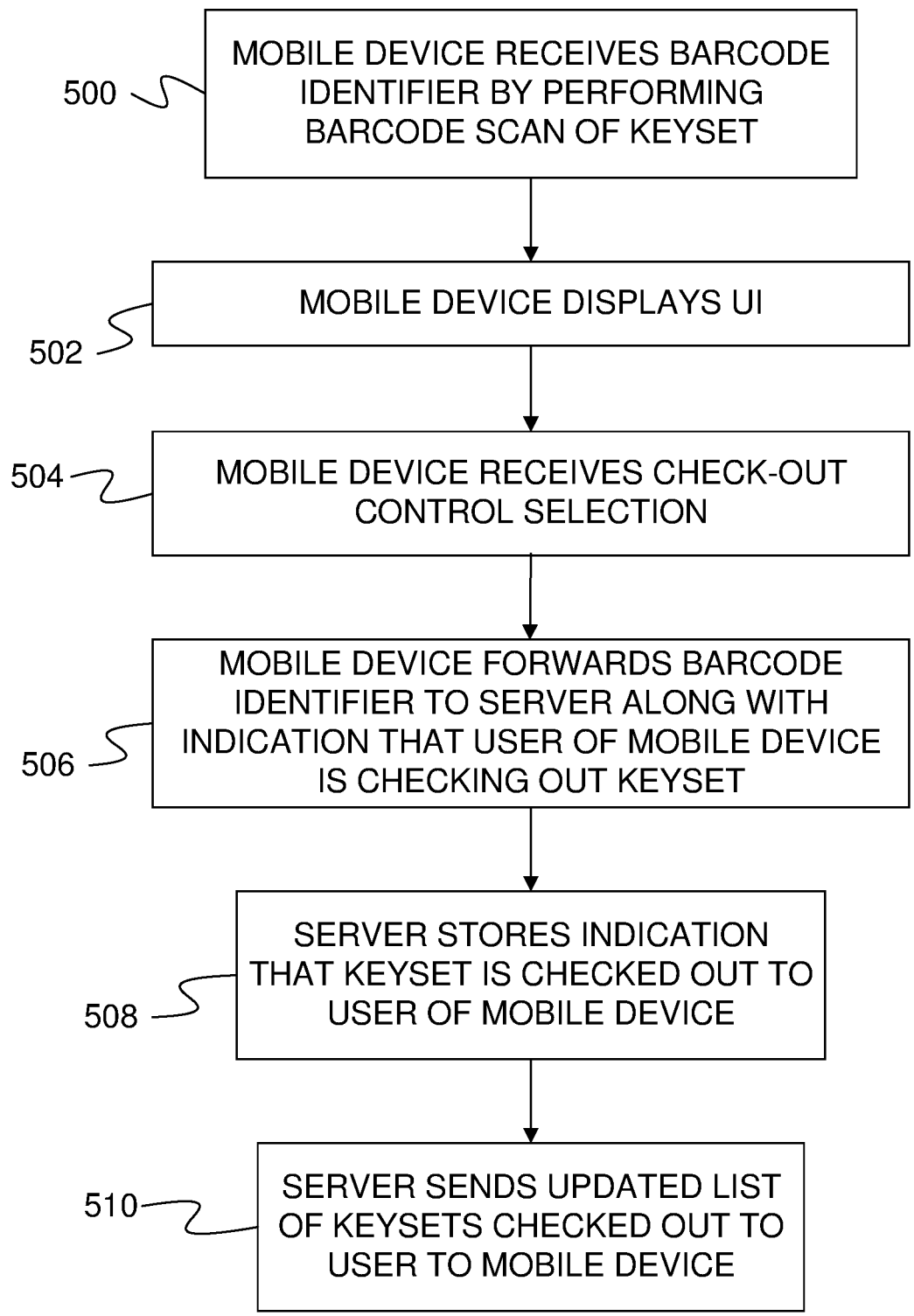
FIG. 5 is a flow diagram of a method of checking out a keyset.
Figure 6:
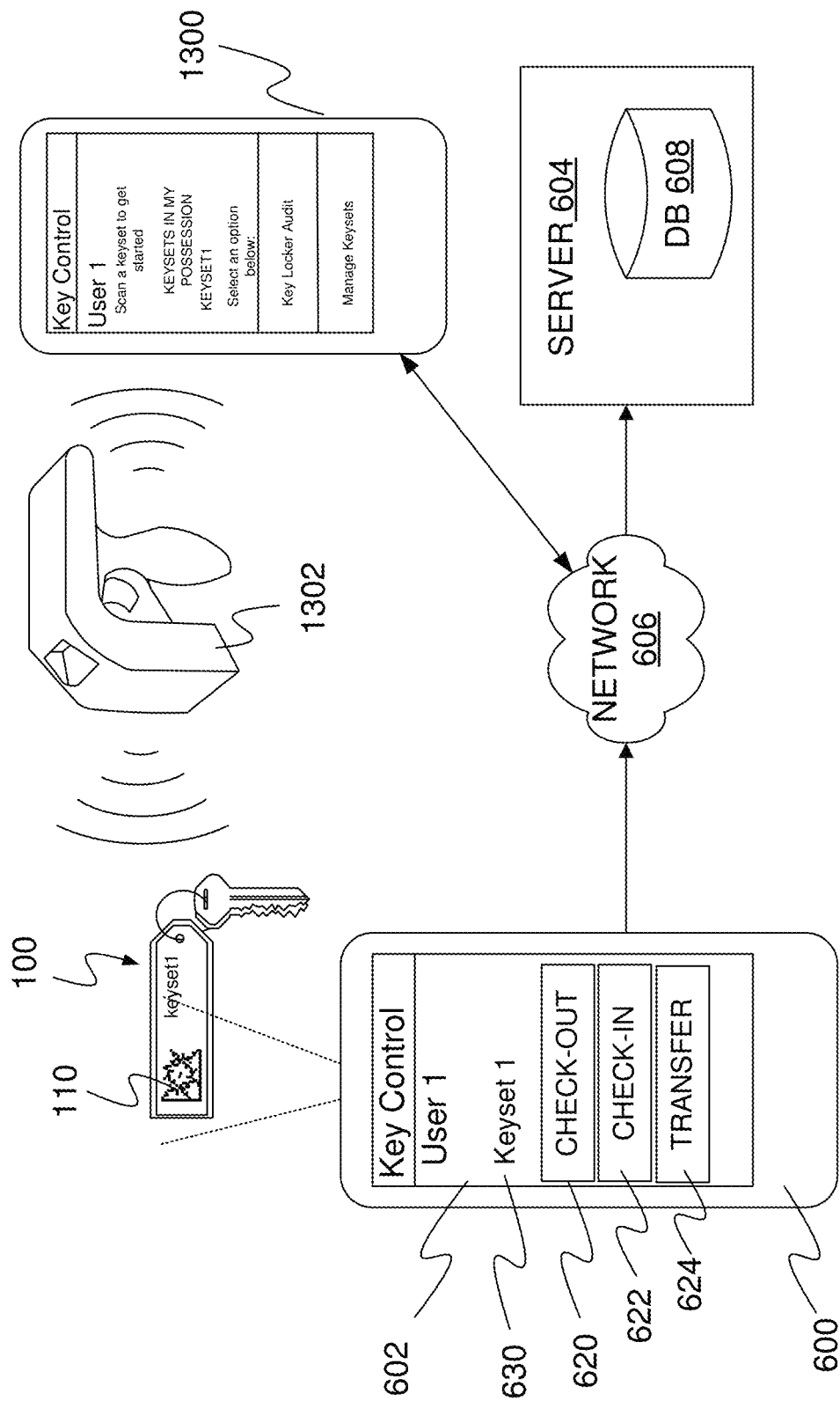
FIG. 6 is a block diagram of elements used in the method of FIG. 5.

FIG. 5 provides a flow chart and FIG. 6 provides a block diagram of elements used in a method of checking out a keyset from a key cabinet. In step 500 of FIG. 5, a handheld/mobile device 600 receives a barcode identifier by performing a scan of barcode 110 on keyset 100. In response to the barcode identifier, mobile device 600 generates a user interface 602 that includes the keyset name 630 associated with the barcode identifier, and three input controls 620, 622 and 624 at step 502. The keyset name can be retrieved locally on mobile device 600 using the barcode identifier or can be retrieved by making a request to a server 604 through a network 606. Input control 620 is used to indicate that a user wishes to check-out a keyset.

At step 504, mobile device 600 receives a selection of check-out control 602 and in response, at step 506, mobile device 600 forwards the barcode identifier to server 604 along with an indication that a user of mobile device 600 is checking out keyset 100. In accordance with one embodiment, the user of mobile device 600 is identified by requiring the user to log into mobile device 600 before they are able to use mobile device 600. In accordance with one embodiment, the barcode identifier is forwarded through network 606 to server 604, where network 606 can include a Wi-Fi network connected to a wide area network, such that server 604 can be located within the same building as mobile device 600 or in a location remote from mobile device 600.

Figure 7:
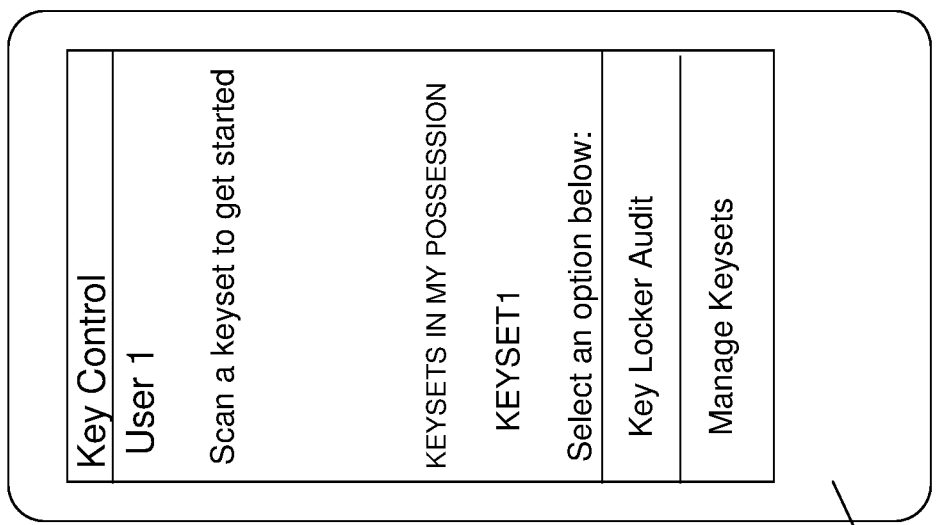
FIG. 7 is a view of a mobile device showing a user interface in accordance with one embodiment.

At step 508, server 604 stores an indication that keyset 100 is checked out to the user of mobile device 600 in a database 608. At step 510, server 604 returns an updated list of keysets checked out to the user of mobile device 600. Mobile device 600 can then display the updated list of keysets checked out to the user as shown in FIG. 7 where mobile device 600 displays that keyset 100, identified as Keyset 1, is checked out to the user of mobile device 600.

An identical process is used to check-in a keyset except that check-in control 62 is selected at step 504, the mobile device indicates that the user of the mobile device is checking in the keyset at step 506, the server stores an indication that the keyset has been checked into the key cabinet at step 508, and the updated key list indicates that the keyset is no longer in the user's possession.

In accordance with some embodiments, one user is able to transfer a keyset to another user without having to return to the cabinet. This improves worker efficiency and improves the tracking of keysets since workers are prone to transfer keys without entering that information into a digital system when they are required to return to the key cabinet in order to enter such information.

Figure 8:
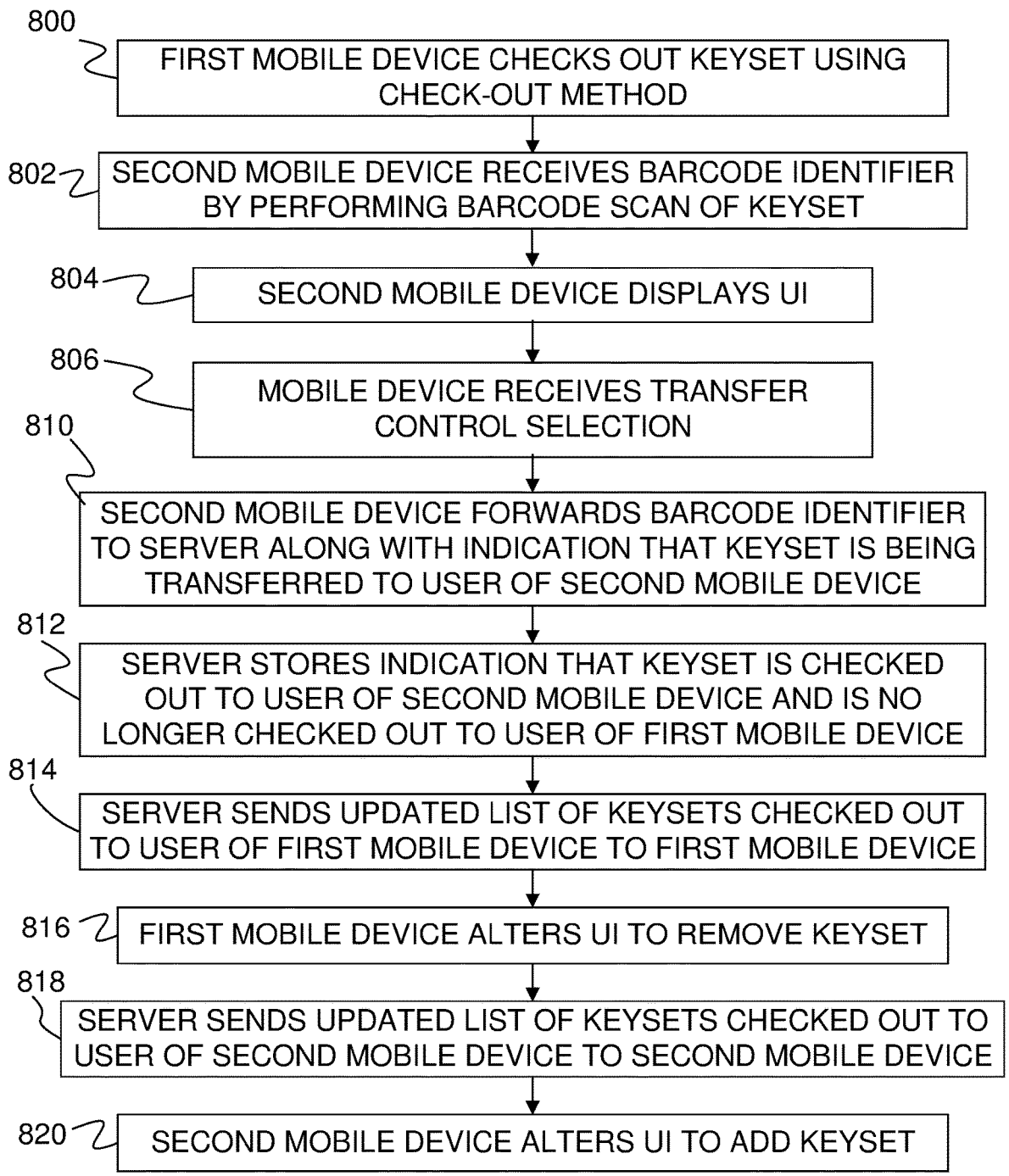
FIG. 8 is a flow diagram of a method of transferring a keyset between users.

FIG. 8 provides a flow diagram for transferring a keyset in accordance with such embodiments. In the discussion below, a first user is using a first mobile device 900 and a second user is using a second mobile device 1000.

Figure 9:
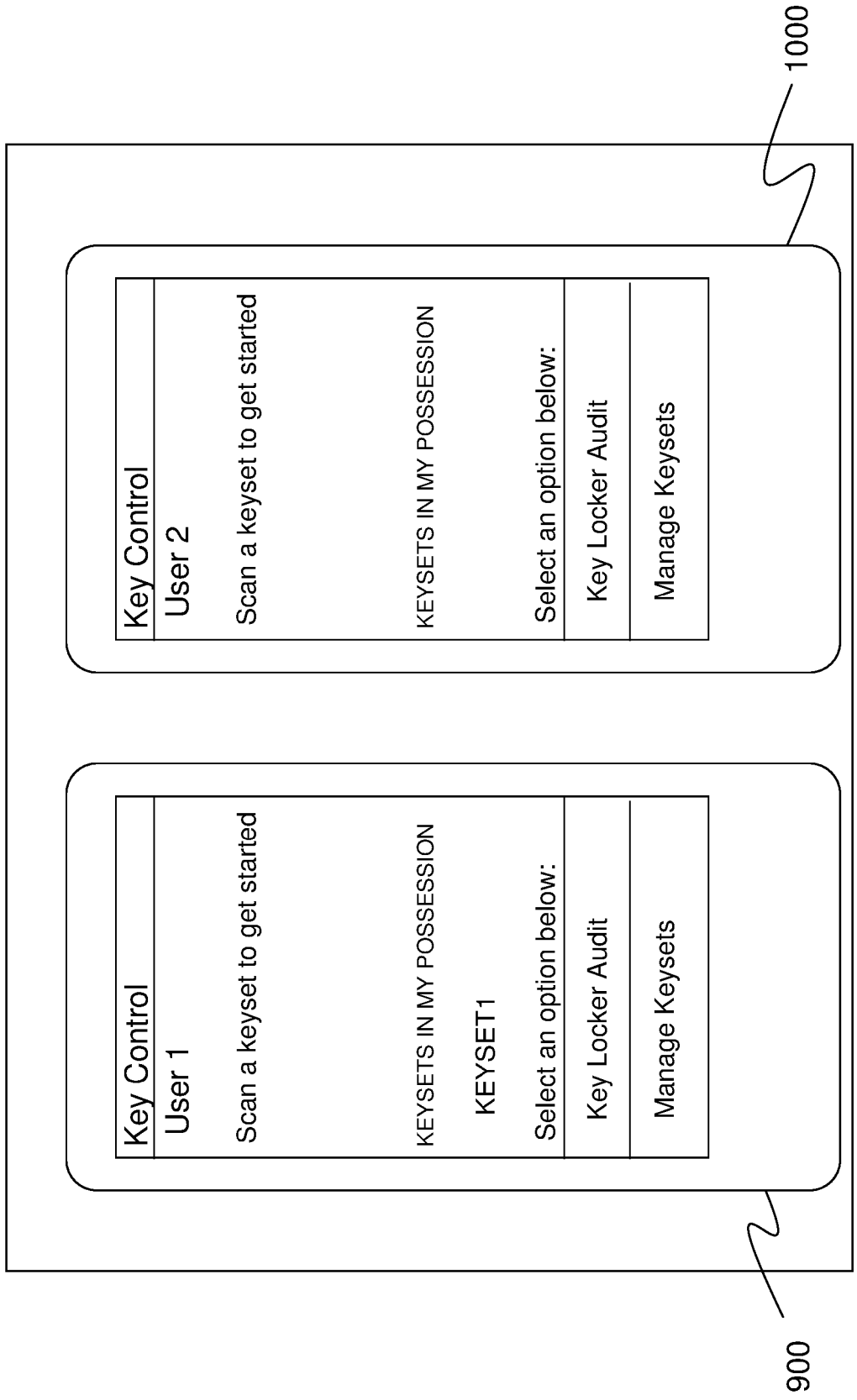
FIG. 9 is a view of interfaces on two different mobile devices before a transfer is performed.

In step 800 of FIG. 8, the first user uses first mobile device 900 to check out a keyset using the method of FIG. 5. After the first user has checked out the keyset, first mobile device 900 and second mobile device 1000 indicate that the first user is in possession of the keyset, Keyset 1, and the second user is not in possession of the keyset as shown in FIG. 9.

Figure 10:
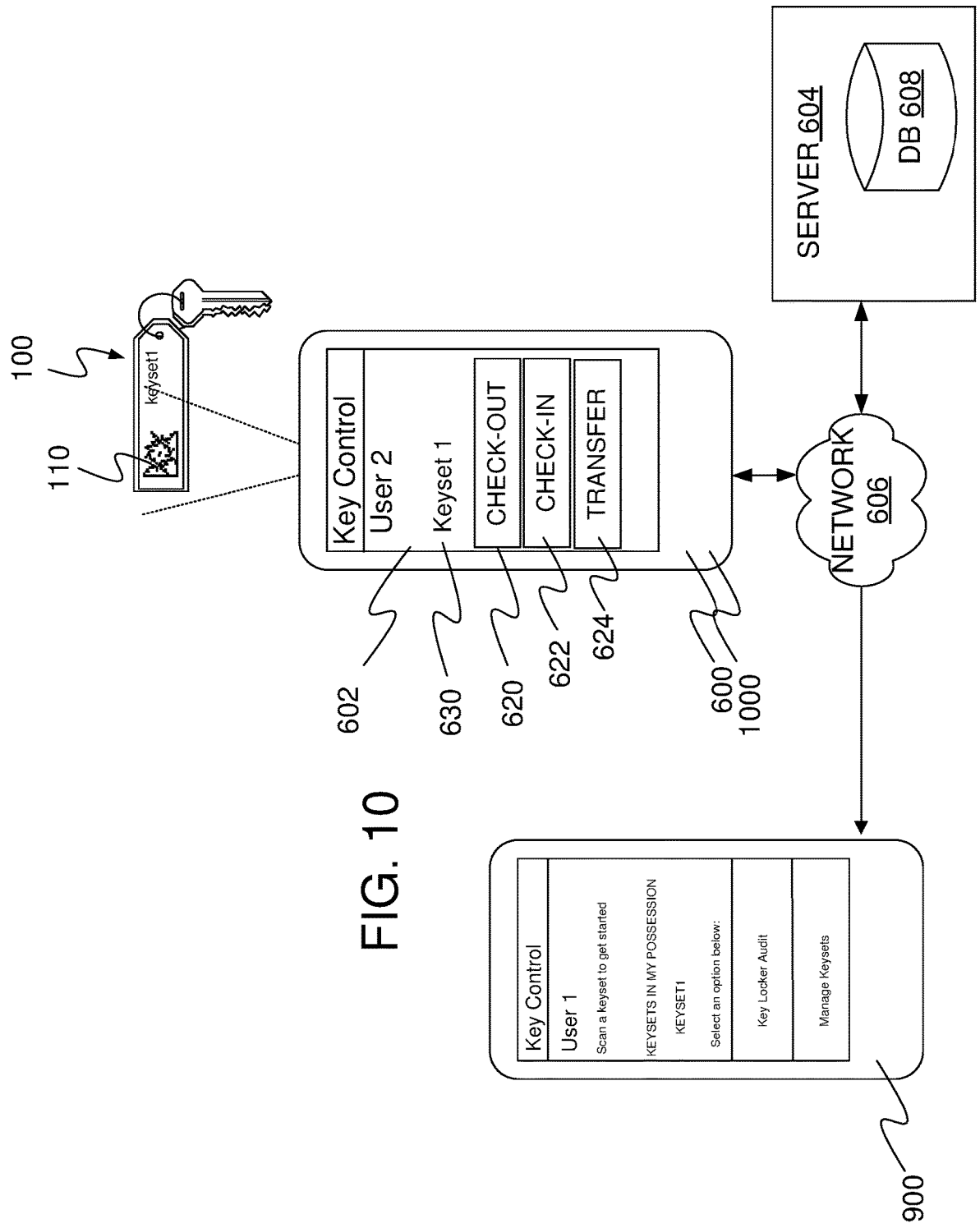
FIG. 10 is a block diagram of elements used in the method of FIG. 8.

FIG. 10 provides a block diagram of elements used in the remaining steps of FIG. 8. At step 802, second mobile device 1000 scans barcode 110 on keyset 100 to obtain the barcode identifier for keyset 100. In response to the barcode identifier, mobile device 1000 generates user interface 602 that includes the keyset name 630 associated with the barcode identifier, and the three input controls 620, 622 and 624 at step 804. The keyset name can be retrieved locally on mobile device 1000 using the barcode identifier or can be retrieved by making a request to server 604 through network 606. Input control 624 is used to indicate that a user wishes to transfer a keyset from another user to themselves.

At step 806, mobile device 1000 receives an indication that Transfer control 624 has been selected and in response, at step 810, mobile device 1000 forwards the barcode identifier to server 604 along with an indication that the user of the second mobile device is being transferred the keyset. At step 812, server 604 stores an indication that the keyset is checked out to the second user in database 608. In addition, server 604 changes database 608 to indicate that keyset 100 is no longer checked out to the first user. At step 814, server 604 sends an updated list of keys that are in the possession of the first user to mobile device 900 through network 606. This updated key list does not have keyset 100 in it. At step 816, mobile device 1000 updates a user interface that displays which keysets are in the possession of the first user.

At step 818, server 604 sends an updated key list to mobile device 1000 that indicates all of the keys currently checked out to the second user, including keyset 100. At step 820, mobile device 1000 updates the user interface used to show which keysets the second user has possession of.

Figure 11:
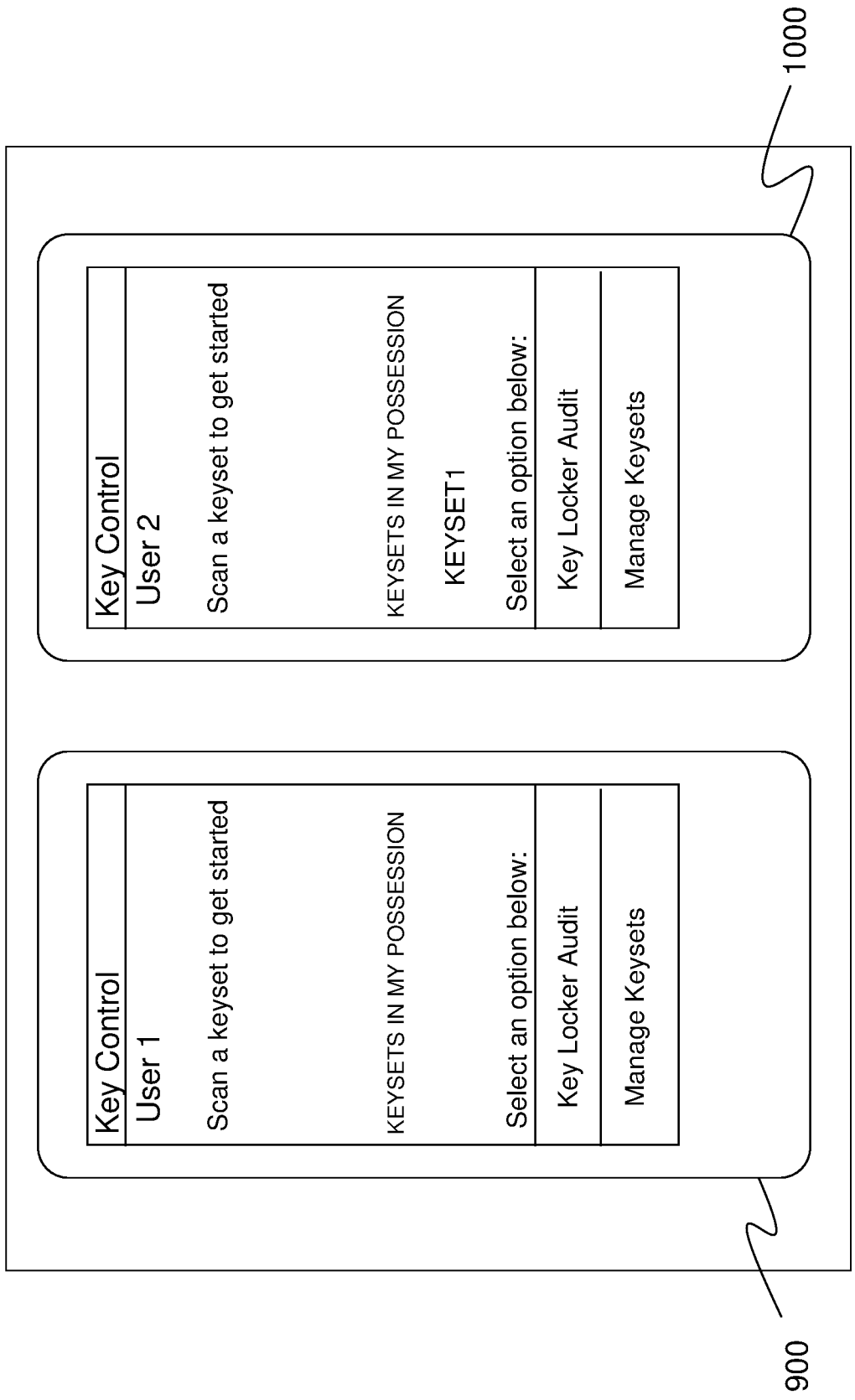
FIG. 11 is a view of interfaces on the two mobile devices after the transfer is performed.

FIG. 11 depicts mobile devices 900 and 1000 with each device showing the user interface that conveys which keysets are checked out to the users of mobile devices 900 and 1000. In particular, the user interface displayed on mobile device 900 indicates that keyset 100 is no longer in the possession of the first user, User 1, while the user interface on mobile device 1000 indicates that keyset 100, designated as Keyset 1 in the user interface, is checked out to the second user, User 2. Thus, after step 820, mobile devices 900 and 1000 reflect the transfer of the keyset from the first user to the second user.

Figure 12:
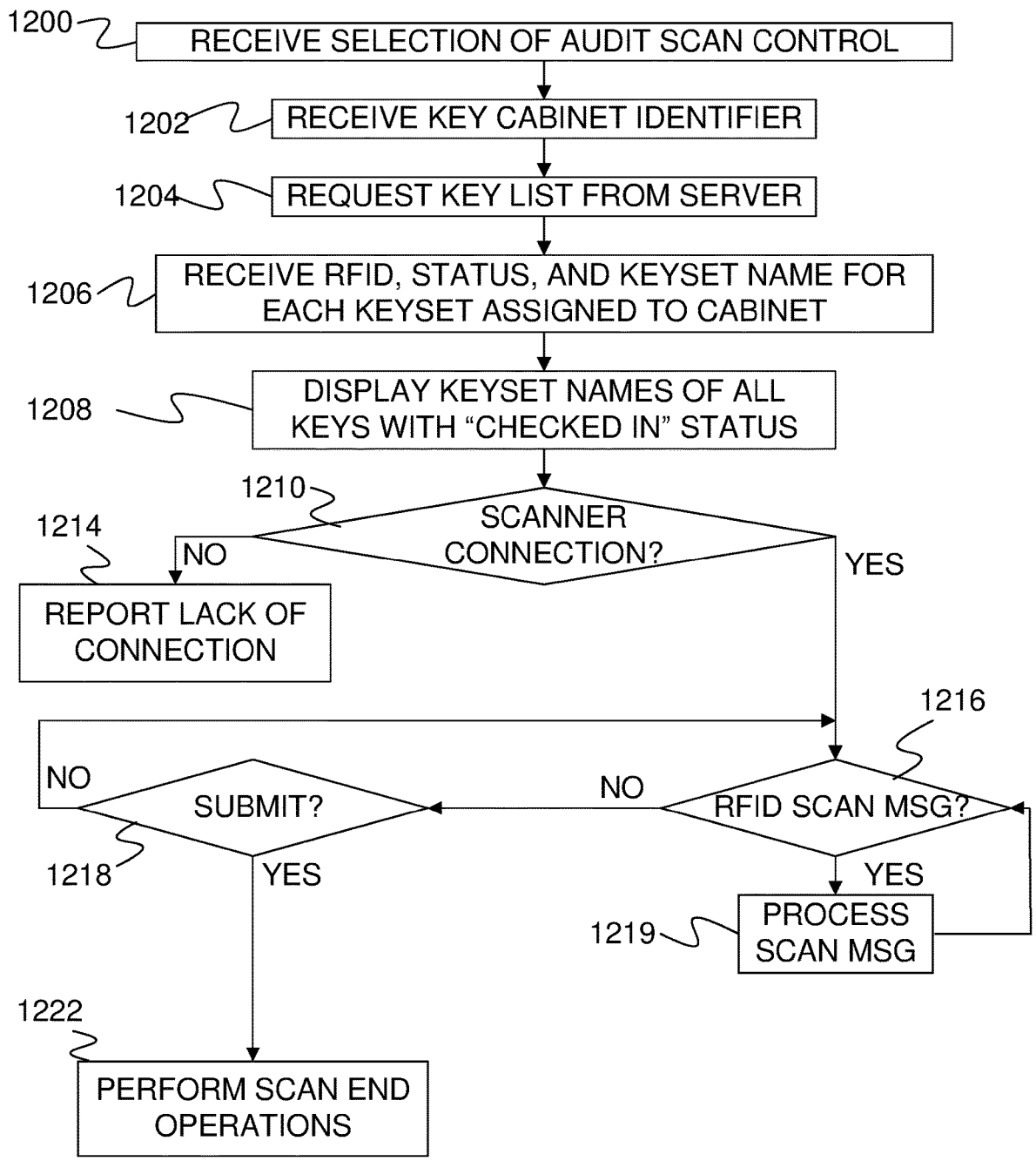
FIG. 12 is a flow diagram of a method of auditing keysets in a key cabinet.

FIG. 12 provides a method for auditing a collection of keysets stored in a key cabinet in accordance with one embodiment. FIG. 13 provides a plan view of elements used in the method of FIG. 12.

In step 1200 of FIG. 12, a mobile device 1300 receives a selection of a Key Locker Audit control 1302 on a user interface displayed by mobile device 1300. In response, mobile device 1300 displays user interface 1400 of FIG. 14. User interface 1400 includes a pulldown menu 1402 that allows a user to select a key cabinet from a collection of key cabinets that are located in a building. At step 1202, the user selects one of the key cabinets and the key cabinet identifier is received by mobile device 1300. At step 1204, mobile device 1300 sends a request to server 604 for a list of all keysets that are assigned to the key cabinet identified by the key cabinet identifier. In response, server 604 accesses database 608 and retrieves an RFID, status, and keyset name for each key assigned to the cabinet. This information is returned to mobile device 1300 at step 1206.

At step 1208, mobile device 1300 searches the keyset list for all keysets that have a "checked in" status which means that the keysets are expected to be in the selected key cabinet. Mobile device 1300 then displays the names of all keysets with the "checked in" status in user interface 1400. An example of such a keyset list 1500 is shown in FIG. 15. The user interface also includes a "submit" button 1502, which the user can select to indicate that scanning is complete.

At step 1210, mobile device 1300 confirms that there is a wireless connection to an RFID scanner 1302. If there is no connection to a scanner at step 1212, user interface 1300 reports the lack of connection in a user interface at step 1214. If there is a wireless connection to scanner 1302, mobile device 1300 enters a loop where it waits for RFID scan messages from RFID scanner 1302 at step 1216. If an RFID scan message is not received at step 1216, mobile device 1300 determines if submit button 1502 has been selected at step 1218. If the submit button has not been selected, mobile device 1300 returns to step 1216 to see if an RFID scan message has been received.

Scanner 1302 emits radio frequency interrogation signals that are received by the RFID tags on the keysets in key cabinet 1304, such as keysets 1306, 1308, 1310 and 1312, which each have a barcode and RFID tag as described above for keyset 100 . . . . In response to the interrogation signals, the RFID tags on each of the keysets emit their radio frequency identifiers which are received by scanner 1302. For each received radio frequency identifier (RFID), scanner 1302 sends the RFID in an RFID scan message through the wireless connection to mobile device 1300. When such an RFID scan message is received by mobile device 1300, the scan message is processed at step 1219. As shown in FIG. 6, in addition to barcode 110 on keyset 100 being scannable by mobile device 600, RFID tag 302 within keyset 100 can be interrogated by scanner 1302. For example, when keyset 100 is placed in a key cabinet such as key cabinet 1304 and scanner 1302 emits radio frequency interrogation signals as discussed above, RFID tag 302 emits its radio frequency identifier (RFID), which is received by scanner 1302. Scanner 1302 sends this RFID in an RFID scan message through the wireless connection to mobile device 1300 and is processed at step 1219.

Figure 16:
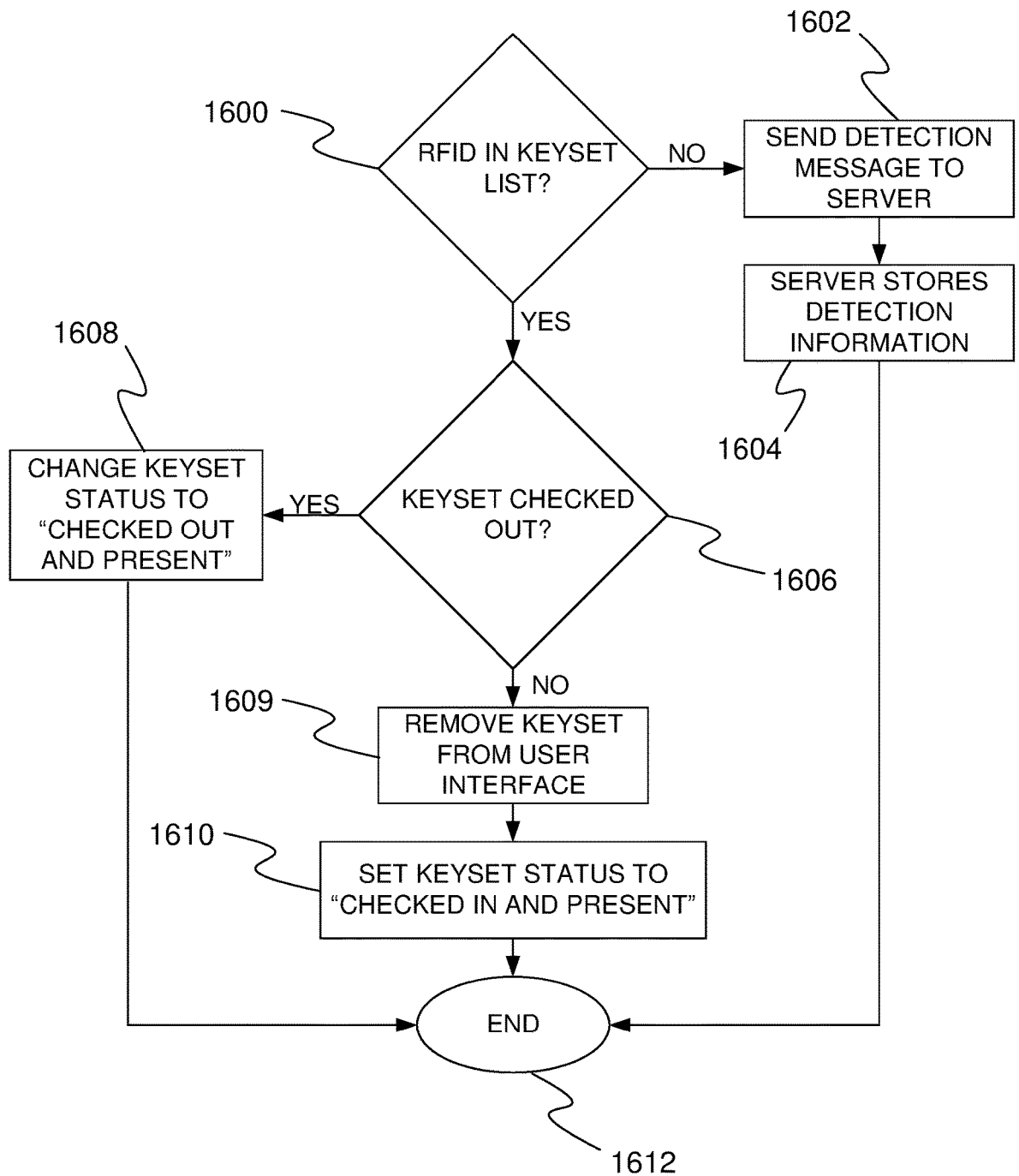
FIG. 16 is a flow diagram of a method performed to process a scan message.

FIG. 16 provides a flow diagram of a method performed during the processing of an RFID scan message at step 1219. At step 1600 of FIG. 16, the RFID that is received as part of the RFID scan message is compared to the keyset list for the current key cabinet. If the RFID is not associated with a keyset in the keyset list for the key cabinet, a detection message is sent to server 604 at step 1602. The detection message indicates the RFID of the keyset as well as the identity of the key cabinet that was being scanned. Server 604 stores this information in database 608 at step 1604. Note that server 604 does not indicate that the keyset is checked into cabinet 1304 but simply indicates that the keyset was detected. It is possible that the keyset is not within key cabinet 1304 but instead is within a different key cabinet close to key cabinet 1304 or is within the pocket of the user performing the scan. By recording that the keyset was detected, server 604 creates an audit trail that helps in locating missing keysets should the keyset that was detected be in an incorrect cabinet or some other location where the keyset should not be. The user interface on mobile device 1300 is not updated to indicate the presence of such a keyset. This simplifies the user interface and makes it less confusing for the user.

If the RFID in the scan message is assigned to key cabinet 1304 at step 1600, mobile device 1300 determines if the keyset associated with the RFID has a "checked out" status at step 1606. If the keyset has a "checked out" status, mobile device 1300 changes the status at mobile device 1300 to "checked out and present" at step 1608. This status indicates that even though the keyset is designated as being checkout it is actually present in key cabinet 1304.

If the detected keyset does not have a status of "checked out" at step 1606, the keyset is removed from the user interface on mobile device 1300 at step 1608. For example, in user the interface of FIG. 15, if keyset 7 was listed in the scan message, keyset 7 would be removed from the user interface thereby producing the user interface of FIG. 17.

At step 1610, the status of the keyset is changed to "checked in and present" indicating that the keyset that was expected to be in key cabinet 1304 and was present in the key cabinet 1304. After steps 1604, 1608 or 1610, the process of FIG. 16 ends.

Returning to FIG. 12 after processing the scan messages at step 1219, mobile device 1300 returns to step 1216 to determine if there is a new RFID scan message to process. If there is a new message to process, the new message is processed by returning to step 1219. If there are not more RFID scan messages to process, the method returns to step 1218 to determine if the submit button has been selected.

If there are no keysets with a "checked in" status after step 1219 is performed, the user interface will not list any keysets. At this point, the user can stop scanning if they wish and select submit button 1502. Alternatively, the user can continue to scan for a desired period of time, regardless of how many "checked in" keysets are displayed on the user interface, before selecting the submit control. When the submit control is selected, the process of FIG. 12 continues at step 1222, where end of scan operations are performed.

Figure 18:
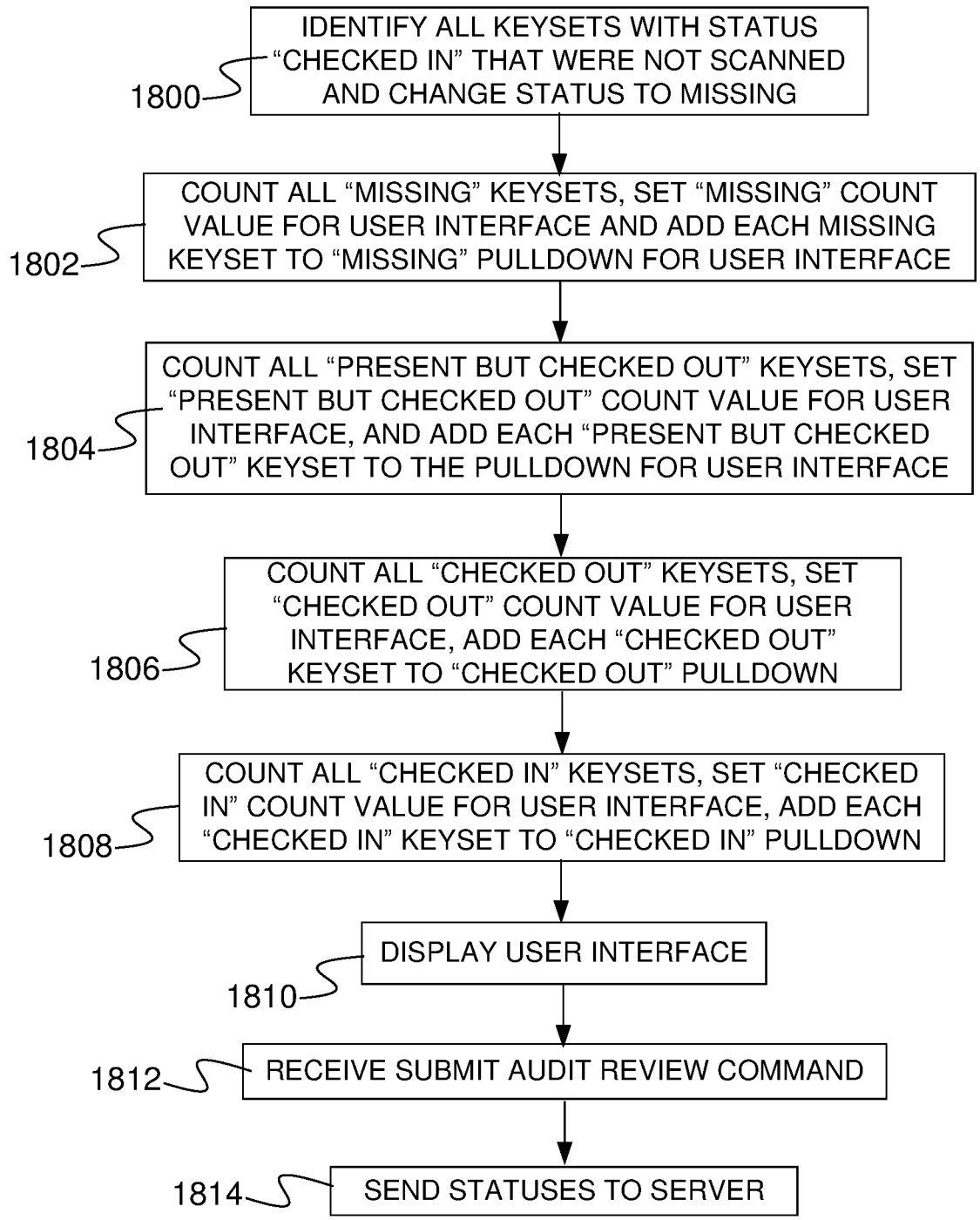
FIG. 18 is a flow diagram of an end of scan operation method.

FIG. 18 provides a flow diagram of the method of performing the end of scan operations. In step 1800, mobile device 1300 identifies all keysets with a status of "checked in" that were not scanned and changes the status of each such keyset to "missing". These are keysets that were not detected during the scan but which were expected to be in key cabinet 1304 based on their "checked in" status.

At step 1802, the number of "missing" keysets is counted and the resulting value is set as the "missing" count value for a user interface. In addition, the name of each "missing" keyset is added to a "missing" pulldown for the user interface.

At step 1804, all keysets with a "present but checked out" status are identified and counted. The count value is set in a user interface for the "present but checked out" keysets and the name of each "present but checked out" keyset is added to the respective pulldown for the user interface.

At step 1806, all keysets with a status of "checked out" are counted and the count is set in the user interface for the "checked out" keysets. In addition, the name of each "checked out" keyset is added to the "checked out" pulldown in the user interface.

At step 1808, all "checked in" keysets that were scanned are counted and the resulting count value is set in the user interface for the checked in keysets. The name of each "checked in" keyset is added to the "checked in" pulldown in the user interface.

Figure 19:
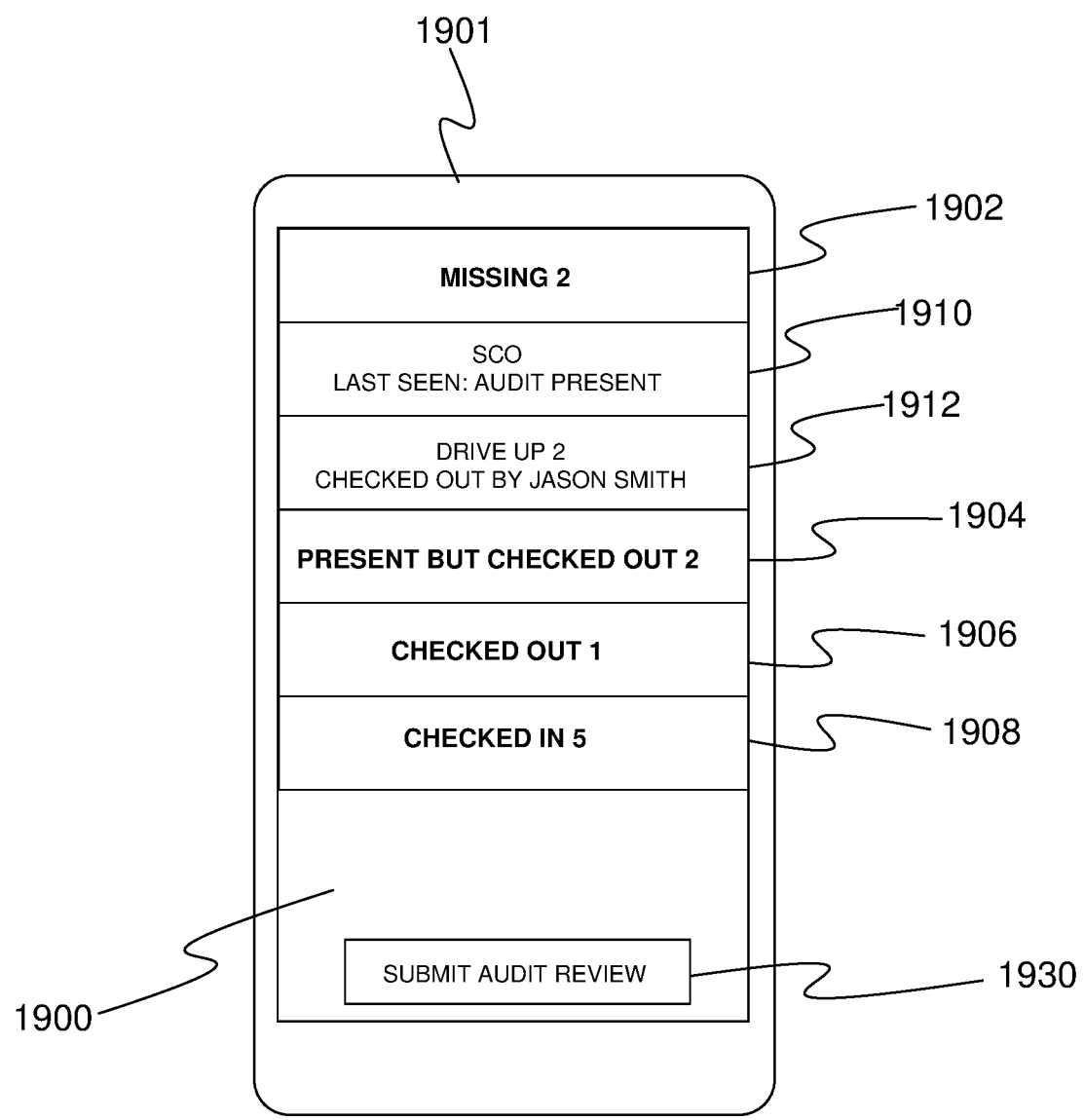
FIG. 19 is a view of a user interface showing the results of a scan of a key cabinet.

At step 1810, the user interface showing the results of the scan is displayed. FIG. 19 provides an example of a user interface 1900 displayed on a mobile device 1901 at step 1810. User interface 1900 includes category controls 1902, 1904, 1906 and 1908, for keysets with statuses of "missing", "present but checked out", "checked out", and "checked in", respectively. Each category control includes a count of the number of keysets in the category. For example, for category control 1902, the displayed count value is 2 indicating that 2 keysets were missing. To access a pulldown that provides a list of the keysets in each category, the user simply selects the category control. In FIG. 19, the category control 1902 for missing keysets has been selected causing a pulldown consisting of two keyset entries 1910 and 1912 to be displayed. Each keyset entry includes the name of the keyset and the last time that the keyset was detected. User interface 1900 also includes a Submit Audit Review button 1930 that when selected at step 1812 sends the results of the audit scan to server 604 through network 606 at step 1814.

The results provided to server 604 can be used for multiple purposes. For example, the results can be used to generate reporting on which stores are performing well and which are not performing well with regards to key control to indicate training opportunities for individuals at those sites. Further, the data allows automatic alerting to individuals to remind or train them on the performance of key control tasks based on their calculated performance statistics. For example, if it is the responsibility of the store closing leader to perform a key audit daily at close of store and reporting doesn't indicate these audits being completed, the individual (known from a scheduling systems for instance) can be notified of their responsibility and given training/coaching. Similarly, if an individual team member has checked out keys and the system later detects that other are checking out the same keys without there being an intervening check-in event for the keyset, that individual can be identified and coached to be sure to follow the check-in process. Reporting can also indicate specific stores that may be at risk due to missing keysets or operational performance issues to be addressed from HQ to the stores.

Figure 20:
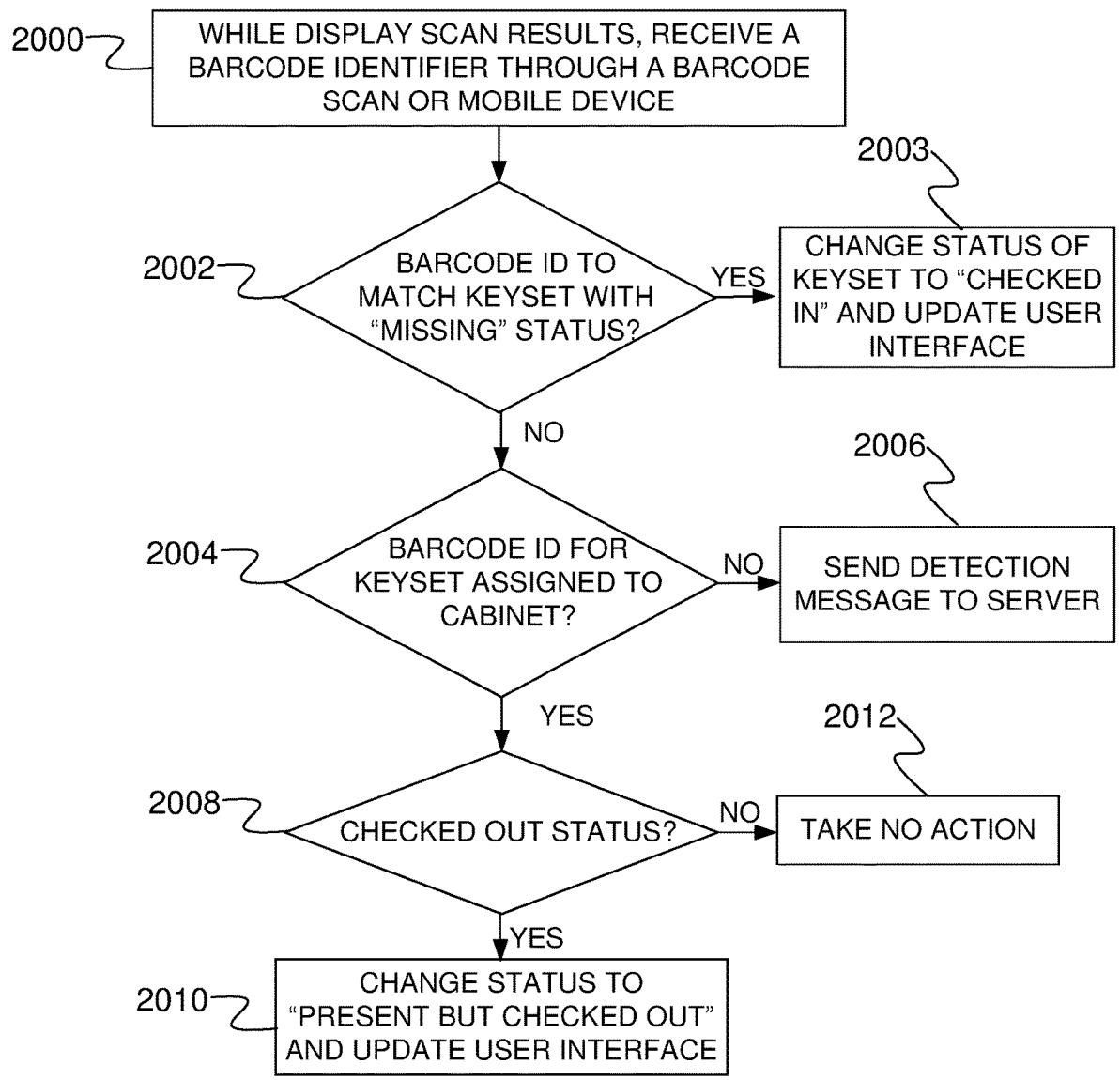
FIG. 20 is a flow diagram of a method of augmenting a scan of a key cabinet with barcode scans.

Before selecting to submit the audit review results, a user may determine that the scan for RFID tags missed one or more keysets in key cabinet 1304. When this occurs, the user can complete the audit of key cabinet 1304 by scanning the barcode of the keyset that was not detected. FIG. 20 provides a flow diagram of a method for completing an audit of a key cabinet.

In step 2000, while displaying the scan results as shown in FIG. 19, a barcode identifier is received through a barcode scan on mobile device 1901. At step 2002, mobile device 1901 determines if the barcode ID matches a keyset with a "missing" status. If the barcode ID matches a keyset with a "missing" status, the status of the keyset is changed to "checked in" and the user interface is updated to increase the count of "checked in" keysets and to reduce the count of "missing" keysets. In addition, the name of the keyset is removed from the "missing" pulldown and is added to the "checked in" pull down.

If the barcode ID does not match a keyset with a "missing" status, mobile device 1901 determines if the barcode ID for the keyset is assigned to the current key cabinet at step 2004. If the barcode ID is for a keyset that is not assigned to the key cabinet, mobile device 1901 sends a detection message to server 604 to indicate that the keyset was scanned during an audit of a key cabinet at step 2006.

If the barcode ID is for a keyset that is assigned to the cabinet at step 2004, mobile device 1901 determines if the keyset has a status of "checked out" at step 2008. If the keyset has a status of checked out, mobile device 1901 changes the status of the keyset to "present but checked out" and updates user interface 1900 to increase the count of the "present but checked out keysets" and to decrease the count of the "checked out" keysets at step 2010. In addition, the name of the keyset is removed from the "checked out" pulldown and is added to the "present but checked out" pull down.

If the keyset does not have a status of "checked out" at step 2008, no action is taken at step 2012. No action is taken at step 2012 because the status of the keyset is already set to "present but checked out."

Figure 21:
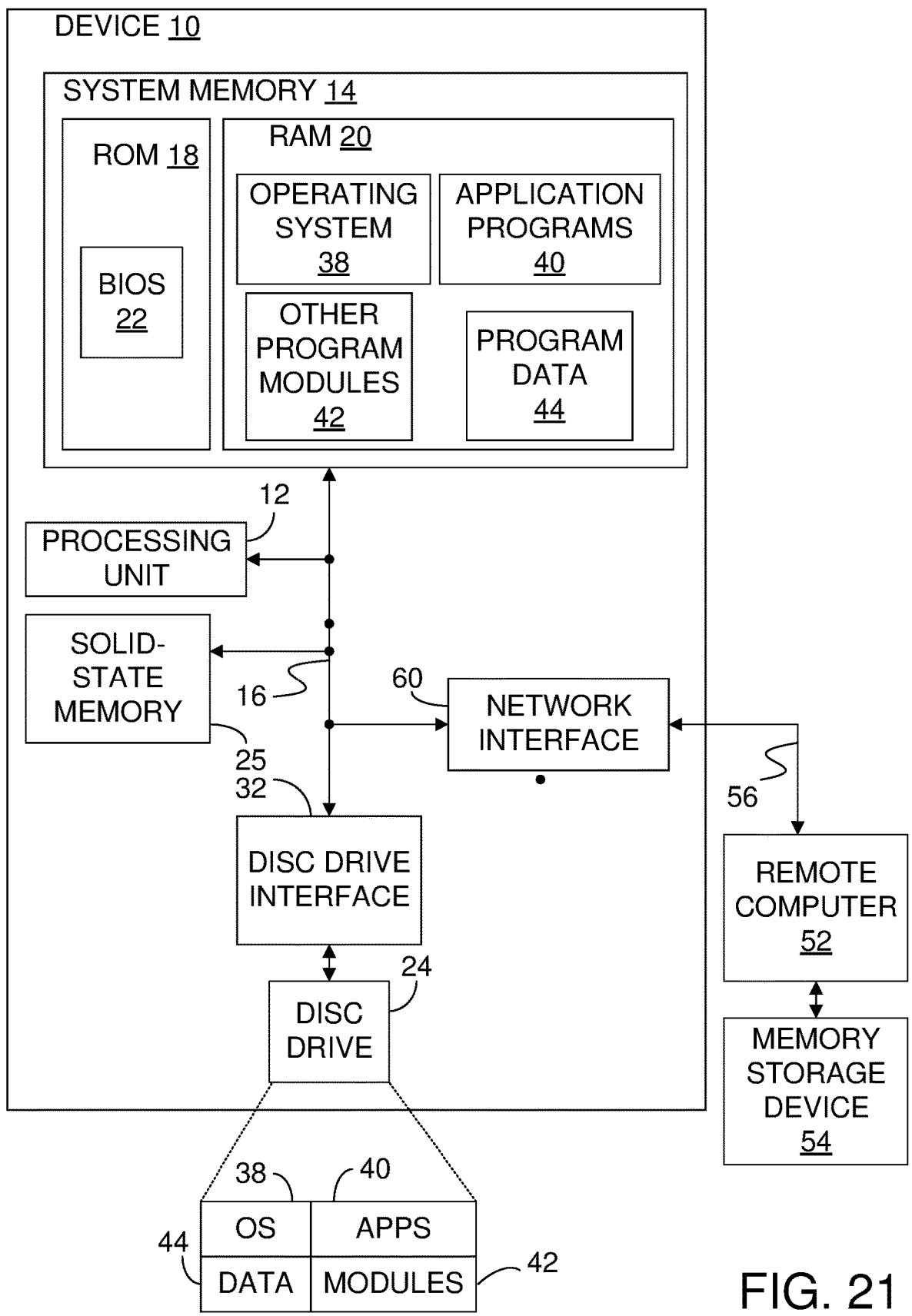
FIG. 21 is a block diagram of an exemplary server.

FIG. 21 provides an example of a computing device 10 that can be utilized as server 604. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24. Hard disc drive 24 is connected to the system bus 16 by a hard disc drive interface 32. The drive and its associated computer-readable media provide nonvolatile storage media for the computing device 10 on which computer-executable instructions and computer-readable data structures may be stored. Other types of media that are readable by a computer may also be used in the exemplary operation environment as non-volatile memory such as solid-state memory.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 21.

The computing device 10 is connected to remote computer 52 through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 21 are exemplary and other means for establishing a communications link between the computers, such as a wireless interface communications link, may be used.

Figure 22:
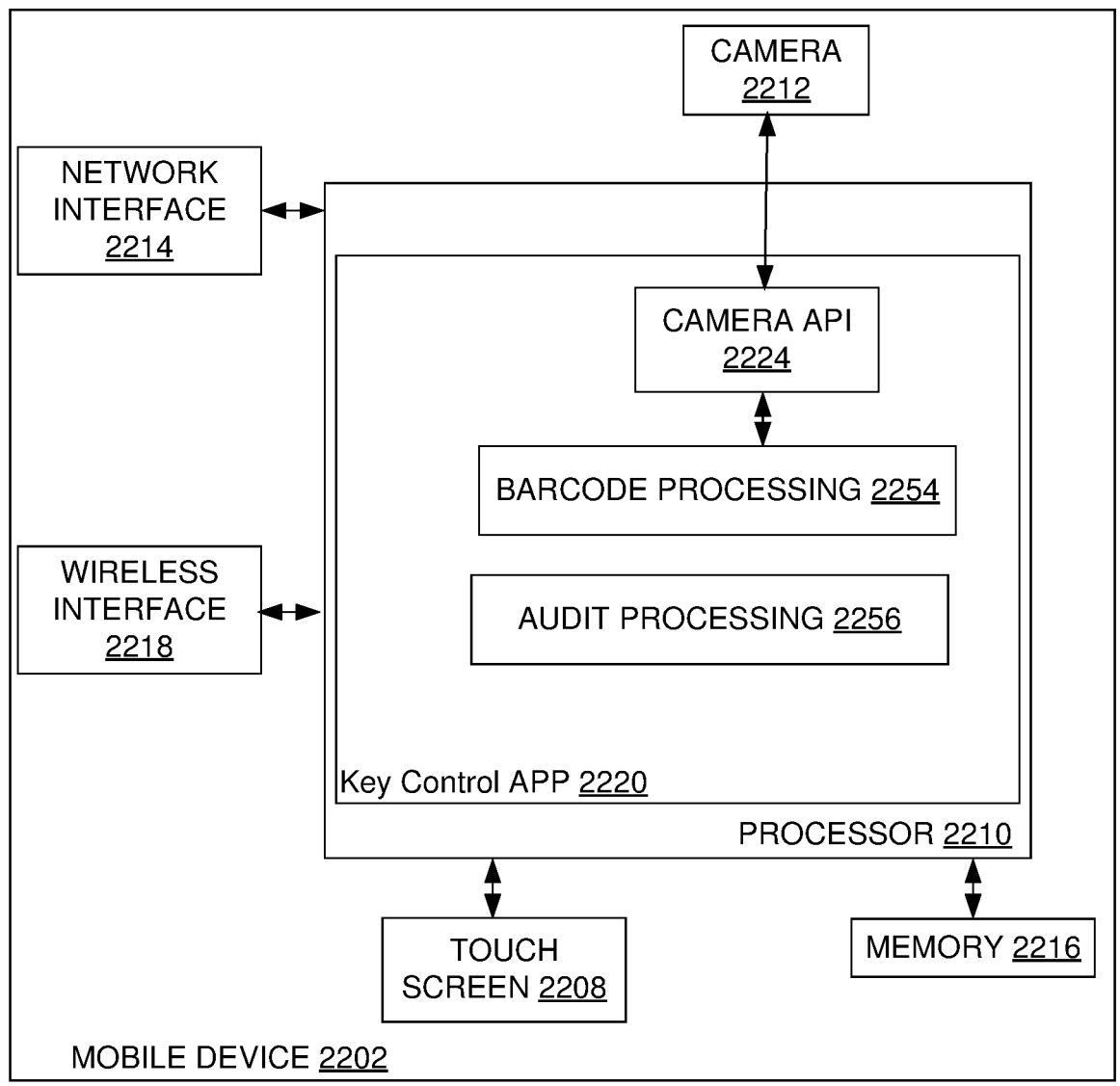
FIG. 22 is a block diagram of an exemplary mobile device.

FIG. 22 provides a block diagram of a mobile device 2202 that can be used as any one of the mobile devices discussed above. Mobile device 2202 includes a touchscreen 2208, a processor 2210, a camera 2212, a network interface 2214, a wireless interface 2218 and a memory 2216. Processor 2210 includes a central processing unit and a local memory cache and is connected to touchscreen 2208, camera 2212, wireless interface 2218, network interface 2214 and memory 2216 through one or more buses and/or interfaces. Processor 2210 is capable of executing one or more applications, referred to as apps, which can be stored in the local cache or in a combination of the local cache and portions of memory 2216 during execution. For example, processor 2210 is shown to be executing key control app 2220 in FIG. 22. Key control app 2220 is able to communicate with server 604 through network interface 2214 and is able to communicate with RFID scanner 1302 through wireless interface 2218.

Key control app 2220 also includes a camera API 2224 that is able to communicate with camera 2212 of mobile device 2202 to activate camera 2212 so that it captures a stream of images and sends the captured images to camera API 2224. Camera API 224 provides the captured images to a barcode processing module 2254, which determined the barcode identifier from the image and applies the barcode identifier in the methods described above. An audit processing module 2256 in key control app 2220 is able to receive RFID scan messages through wireless interface 2218 and is able to perform the audit methods described above.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A system comprising:
   a server;
   a first handheld device configured to scan a barcode on a keyset to obtain a barcode identifier and to relay the barcode identifier to the server to check the keyset out of a key cabinet;
   a radio frequency identifier (RFID) reader configured to receive a radio frequency identifier (RFID) signal from a radio frequency identifier (RFID) tag on the keyset to obtain a radio frequency identifier (RFID) identifier and to relay the RFID identifier to a second handheld device; and
   the second handheld device, configured to receive the RFID identifier sent by the RFID reader and to determine that the keyset was detected during a scan of a key cabinet by the RFID reader based on the received RFID identifier.

2. The system of claim 1 wherein the second handheld device is further configured to scan a barcode on a second keyset to obtain a barcode identifier for the second keyset and to use the barcode identifier for the second keyset to report that the second keyset is in the key cabinet.

3. The system of claim 1 wherein the second handheld device is further configured to display a list of keysets detected during the scan of the key cabinet.

4. The system of claim 3 wherein the second handheld device is further configured to display a list of keysets that are designated as checked-in in the key cabinet but were not detected during the scan of the key cabinet.

5. The system of claim 4 wherein the second handheld device is further configured to display a list of keysets that are designated as checked out of the key cabinet and were not detected during the scan of the key cabinet.

6. The system of claim 1 wherein the second handheld device is further configured to:
   determine that a second keyset detected during the scan of the key cabinet by the RFID reader does not belong in the key cabinet;
   send an indication to the server that the second keyset was detected; and
   suppress information about the second keyset from a user interface that indicates keysets that were detected during the scan of the key cabinet.

7. The system of claim 6 wherein the second keyset detected during the scan of the key cabinet is not present in the key cabinet.

* * * * *